(12) United States Patent
Kurumai

(10) Patent No.: US 8,763,151 B2
(45) Date of Patent: Jun. 24, 2014

(54) MEDIATION PROCESSING METHOD, MEDIATION APPARATUS AND SYSTEM

(71) Applicant: Fujitsu Limited, Kawasaki (JP)

(72) Inventor: Noboru Kurumai, Sibuya (JP)

(73) Assignee: Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 13/743,554

(22) Filed: Jan. 17, 2013

(65) Prior Publication Data

US 2013/0133083 A1 May 23, 2013

Related U.S. Application Data

(63) Continuation of application No. PCT/JP2010/063429, filed on Aug. 6, 2010.

(51) Int. Cl.
*G06F 7/04* (2006.01)

(52) U.S. Cl.
USPC .................................. 726/27; 726/4

(58) Field of Classification Search
USPC ........... 726/2, 9, 26, 27, 4; 713/159, 168, 172
See application file for complete search history.

(56) References Cited

U.S. PATENT DOCUMENTS

| | | | | |
|---|---|---|---|---|
| 7,188,138 | B1 * | 3/2007 | Schneider | 709/203 |
| 7,194,552 | B1 * | 3/2007 | Schneider | 709/245 |
| 7,454,421 | B2 * | 11/2008 | Imaeda et al. | 1/1 |
| 7,681,229 | B1 * | 3/2010 | Ebrahimi et al. | 726/4 |
| 7,793,342 | B1 * | 9/2010 | Ebrahimi et al. | 726/8 |
| 7,954,144 | B1 * | 5/2011 | Ebrahimi et al. | 726/12 |
| 8,127,008 | B2 * | 2/2012 | Manning et al. | 709/225 |
| 8,195,808 | B2 * | 6/2012 | Kawabata et al. | 709/227 |
| 2006/0143189 | A1 * | 6/2006 | Imaeda et al. | 707/100 |
| 2010/0138899 | A1 * | 6/2010 | Yamamoto et al. | 726/3 |

FOREIGN PATENT DOCUMENTS

| | | |
|---|---|---|
| JP | 2002-278931 A | 9/2002 |
| JP | 2005-11098 A | 1/2005 |
| JP | 2009-282561 A | 12/2009 |
| JP | 2010-128719 A | 6/2010 |
| JP | 2010-165306 A | 7/2010 |

OTHER PUBLICATIONS

International Search Report mailed on Mar. 15, 2011, issued for International Application No. PCT/JP2010/063429, filed on Aug. 6, 2010 (English).

* cited by examiner

*Primary Examiner* — Samson Lemma
(74) *Attorney, Agent, or Firm* — Oblon, Spivak, McClelland, Maier & Neustadt, L.L.P.

(57) ABSTRACT

A disclosed mediation apparatus collects data of transactions between a provider holding data of a user and a terminal of the user, for authorizing utilization of the data of the user by a consumer, and stores matching data to determine whether response data received from the provider at next time and subsequent times is substantially the same as the response data previously received and reply data used when sending answer data to the provider into an automatic response data storage unit. Thus, the mediation apparatus automatically respond on behalf of the terminal of the user at the next time and subsequent times. Therefore, it is possible to simplify user operations.

9 Claims, 12 Drawing Sheets

| USER ID | CONSUMER FQDN | PROVIDER FQDN | MATCHING DATA1 | REPLY DATA 1 | MATCHING DATA 2 | REPLY DATA 2 |
|---|---|---|---|---|---|---|
| User1 | www.consumer1.com | www.provider1.com | name="AAA"... | approve,... | | |
| User1 | www.consumer2.com | www.provider2.com | name="AAA"... | approve1,... | name="BBB"... | approve2,... |
| ... | ... | ... | ... | ... | ... | ... |

FIG.6

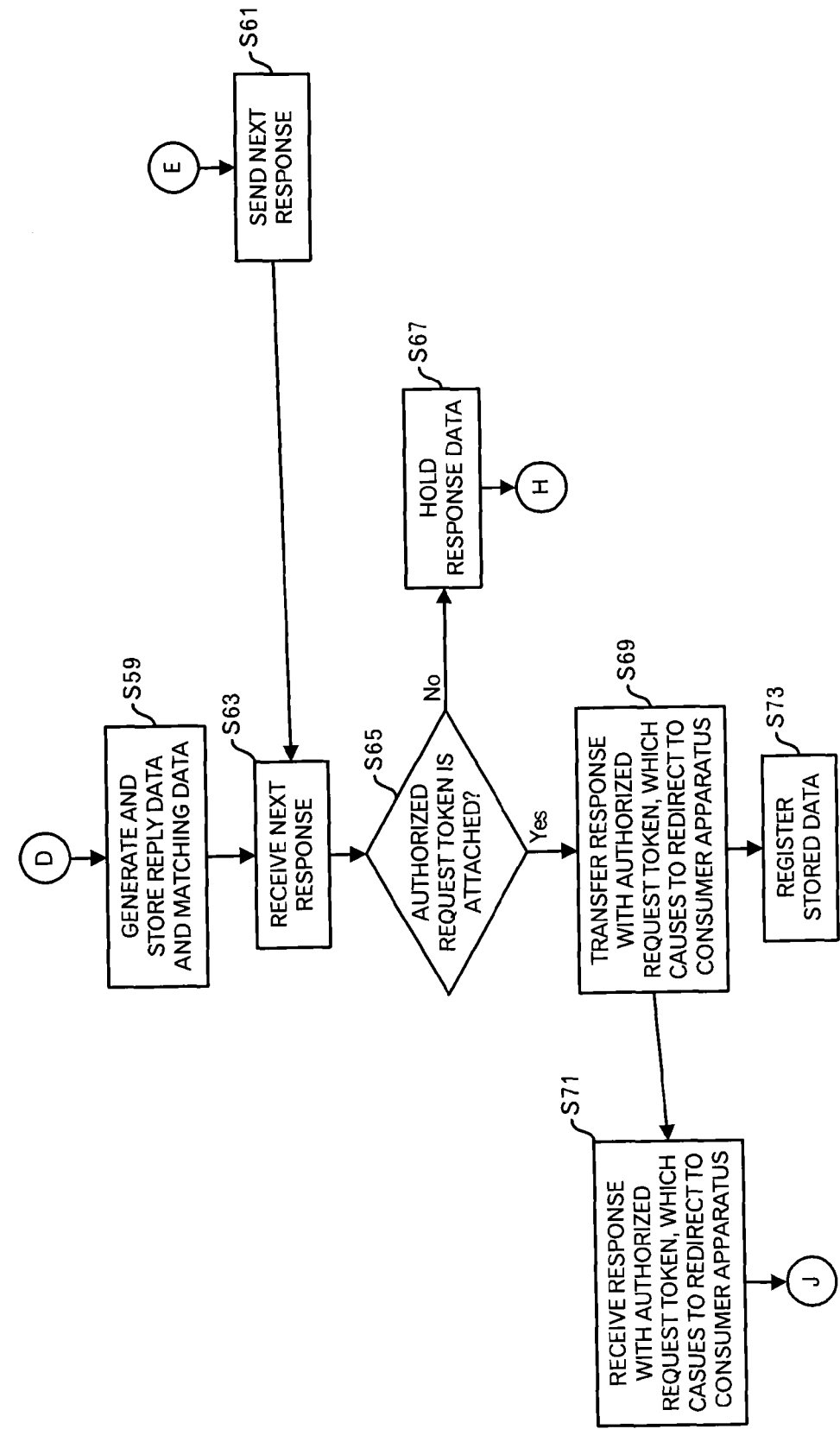

```
<html>
(OMITTED)

<form id="aaa" name="AAA" method="post" action="/authorize" >
  <input type="submit" name="approve" value="APPROVAL" />
  <input type="submit" name="deny" value="DENIAL" />
  <input type="hidden" name="hidden_key1" value="hidden_val1" />
  <input type="hidden" name="hidden_key2" value="hidden_val2" />
  ...
</form>

</html>
```

FIG.10

```
approve=APPROVAL&hidden_key1=hidden_val1&hidden_key2=hidden_val2
```

FIG.11

```
name="AAA" method="post" action="/authorize"

<input type="submit" name="approve" />
  <input type="hidden" name="hidden_key1" />
  <input type="hidden" name="hidden_key2" />
```

FIG.12

```
<html>
(OMITTED)

<form id="aaa" name="AAA" method="post" action="/authorize" >
  <input type="submit" name="approve" value="ALLOWANCE" />
  <input type="submit" name="deny" value="DENY" />
  <input type="hidden" name="hidden_key1" value="secret_val1" />
  <input type="hidden" name="hidden_key2" value="secret_val2" />
  ...
</form>

</html>
```

FIG.15 approve=ALLOWANCE&hidden_key1=secret_val1&hidden_key2=secret_val2

FIG.16

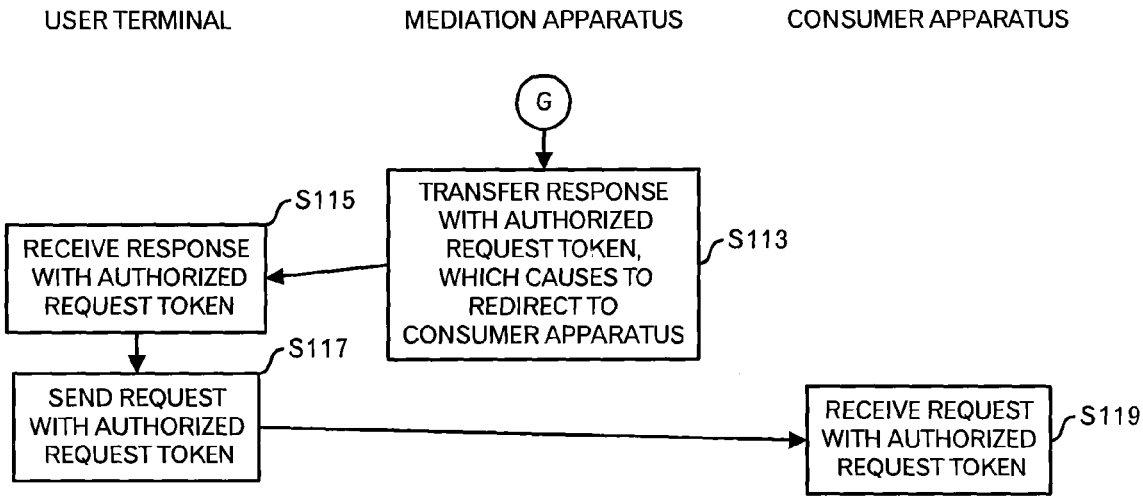

FIG.17

MEDIATION PROCESSING METHOD, MEDIATION APPARATUS AND SYSTEM

CROSS-REFERENCE TO RELATED APPLICATIONS

This application is a continuing application, filed under 35 U.S.C. section 111(a), of International Application PCT/JP2010/063429, filed Aug. 6, 2010.

FIELD

This technique relates to a mediation technique for communication between computers.

BACKGROUND

When a user stores data in a first server, and has a second server use the data stored in the first server, a protocol so called "OAuth" begins to be used. OAuth will be explained using FIG. 1, simply.

As an assumption in FIG. 1, a user stores its own data in a provider. In addition, a consumer registers itself in the provider in advance. Then, the user instructs the consumer to obtain an access right to its own data stored in the provider (step (1)). As a result, the consumer accesses the provider (step (2)), and obtains an unauthorized request token R0 from the provider (step (3)). After that, the consumer has the user redirect to the provider (step (4)). At this time, the consumer attaches the unauthorized request token R0 to Uniform Resource Locator (URL) parameters to send the unauthorized request token R0 to the provider through the user. In response to an access from the user, the provider transmits data to request the user to authorize acquisition of the access right to the provider by the consumer, to the user (step (5)). In response to receipt of the data, the user transmits notification representing the acquisition of the access right by the consumer is allowed to the provider (step (6)). Then, the provider changes the unauthorized request token R0 to the authorized request token R1, and has the user redirect to the consumer (step (7)). At this time, the provider attaches the authorized request token R1 to the URL parameters to send the authorized request token R1 to the consumer through the user.

After that, the consumer transmits the authorized request token R1 to the provider (step (8)), and obtains an access token A from the provider (step (9)). Then, the consumer obtains the data of the user from the provider by using this access token A (step (10)).

Generally, not only plural consumers but also plural providers exist, and the aforementioned processing is carried out for each combination. In addition, because the valid term is set for the access right, the same processing is carried out when the valid term is expired. This is complex for the user.

A conventional technique exists in which an intermediate authentication server is introduced in an authentication mechanism so called "OpenID" to secure the confirmation of the identity. However, this technique cannot resolve the aforementioned problem. Moreover, there is a proxy authentication. For example, a proxy authentication apparatus accesses a server that is connected through a network in response to a request from a client. In this proxy authentication apparatus, plural authentication confirmation logics exist to identify a response representing that the user authentication is incomplete. Then, the proxy authentication apparatus determines based on whether or not the response from the server matches either of the plural authentication confirmation logics, whether the user authentication is required or not. When it is determined that the user authentication is required, the proxy authentication apparatus carries out the user authentication procedure with the server according to the authentication procedure defined in advance in association with the authentication confirmation logic that matches the response from the server. This technique does not assume the situation like in the aforementioned OAuth, and cannot be applied, simply.

SUMMARY

This mediation processing method is executed by a mediation apparatus respectively communicating with a first apparatus holding data of a user, a second apparatus obtaining and using data of the user from the first apparatus and a terminal of the user. Then, this method includes: (A) obtaining an identifier of the user and an identifier of the second apparatus from the terminal of the user, and storing obtained data into a data storage unit; (B) upon receipt of a first response including the identifier of the first apparatus and first data that the first apparatus issues and that represents that use of the data of the user by the second apparatus is unauthorized, from the second apparatus after accessing the second apparatus, confirming whether or not a combination of the identifier of the user, the identifier of the second apparatus, which are stored in the data storage unit, and an identifier of the first apparatus is stored in an automatic response data storage unit storing data for an automatic response for the first apparatus; (C) upon detecting that the combination is not stored in the automatic response data storage unit, transmitting the first response to the terminal of the user; causing the terminal of the user to perform a transaction for an authorization for the use of the data of the user by the second apparatus with the first apparatus through the mediation apparatus to store data of the transaction into the data storage unit; and (D) upon receipt of a response including second data representing that the use of the data of the user by the second apparatus is authorized from the first apparatus, storing matching data and reply data, which are generated from the data of the transaction, which is stored in the data storage unit, into the automatic response data storage unit as correlated with the identifier of the user, the identifier of the second apparatus and the identifier of the first apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram depicting an example of data stored in an automatic response DB;

FIG. 9 is a diagram depicting a processing flow to explain the operations of the system in the embodiment;

FIG. 10 is a diagram depicting an example of authorization request page data;

FIG. 11 is a diagram depicting an example of answer data;

FIG. 12 is a diagram depicting an example of matching data;

FIG. 15 is a diagram illustrating an example of response data;

FIG. 16 is a diagram depicting an example of generated answer data;

FIG. 17 is a diagram depicting a processing flow to explain the operations of the system in the embodiment;

DESCRIPTION OF EMBODIMENTS

Figure 1:
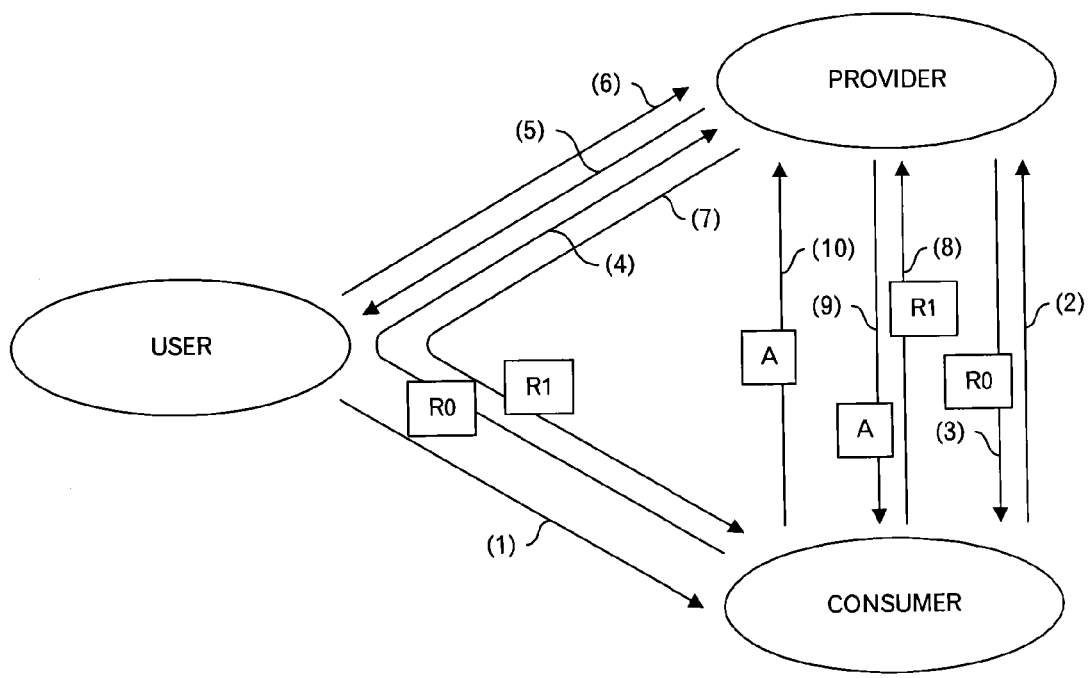
FIG. 1 is a diagram illustrating an outline of a processing in "OAuth"
Figure 2:
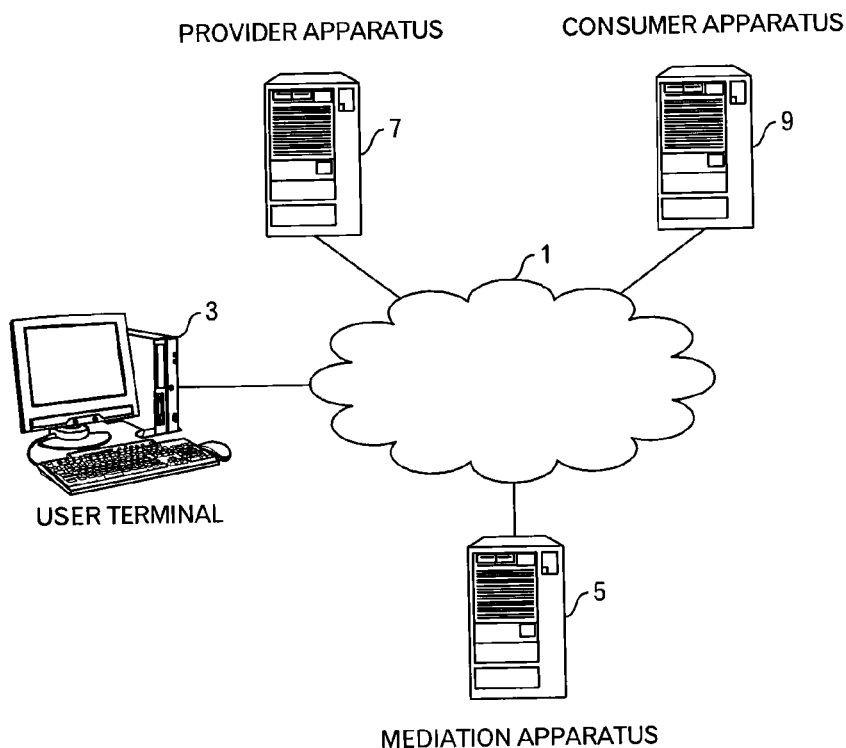
FIG. 2 is a diagram illustrating an outline of a system relating to an embodiment.

FIG. 2 illustrates an outline of a system relating to an embodiment of this technique. For example, one or plural provider apparatuses 7 that operate as a provider in OAuth, one or plural consumer apparatuses 9 that operate as a consumer in OAuth, one or plural user terminals 3 such as a personal computer, in which a Web browser is executed, and a mediation apparatus 5 that carries out a main processing in this embodiment are connected to a network 1 that is an Internet and the like.

In the provider apparatus 7, data of a user of the user terminal 3 is held, and a service desired by the user of the user terminal 3 is provided from the consumer apparatus 9. The provider apparatus 7 is an apparatus that operates based on the conventional OAuth. On the other hand, the consumer apparatus 9 is an apparatus that basically operates based on OAuth, and also executes partially changed operations in order to use the mediation apparatus 5. The user terminal 3 may be a normal personal computer that executes a normal Web browser, for example, as described above.

Figure 3:
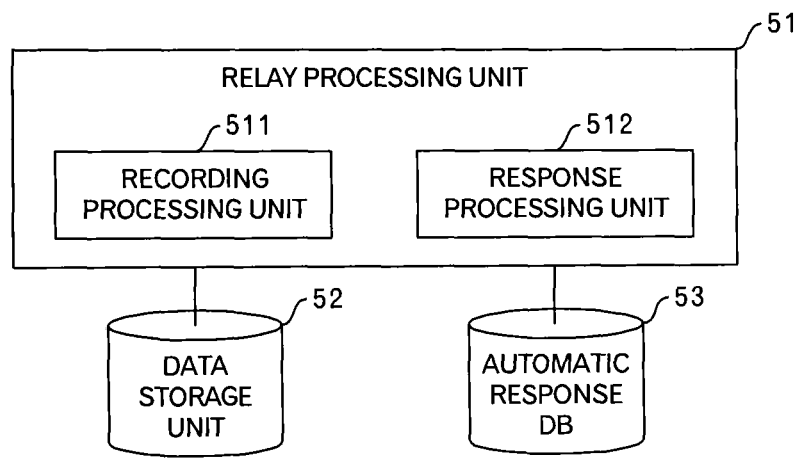
FIG. 3 is a functional block diagram of a mediation apparatus.

FIG. 3 illustrates a functional block diagram of the mediation apparatus 5. The mediation apparatus 5 has a relay processing unit 51, a data storage unit 52 and an automatic response database (DB) 53. The relay processing unit 51 performs a processing to mediate the communication between the user terminal 3 and the consumer apparatus 9, and a processing to mediate the communication between the user terminal 3 and the provider apparatus 7. Then, the relay processing unit 51 has a recording processing unit 511, especially for the latter processing. The recording processing unit 511 generates data for the response processing unit 512 by using the data storage unit 52 to register the generated data into the automatic response DB 53. Furthermore, the relay processing unit 51 also has a response processing unit 512 to automatically perform operations for the authorization of the access right to the consumer apparatus 9, to the provider apparatus 7, on behalf of the user. When receiving data from the provider apparatus 7, the response processing unit 512 transmits transmission data to the provider apparatus 7 by using data stored in the automatic response DB 53 to the provider apparatus 7 on behalf of the user terminal 3.

Next, operations of the system illustrated in FIG. 2 will be explained by using FIGS. 4 to 18. As an assumption, the user of the user terminal 3 has already logged in the consumer apparatus 9, provider apparatus 7 and mediation apparatus 5 using a technique such as a single sign-on. In a case in which such an assumption is not satisfied, the user logs in the respective apparatuses by using a user identifier (ID) and a password when the user firstly accesses.

First, the user operates the user terminal 3 to cause the user terminal 3 to transmit a request to request the consumer apparatus 9 to execute a specific service using specific data of the user, which is stored in the provider apparatus 7, to the consumer apparatus 9 (step S1). When the consumer apparatus 9 receives the request to request to perform the specific service using the specific data of the user, which is stored in the provider apparatus 7 (step S3), the consumer apparatus 9 sends back a response for the redirect to cause the user terminal 3 to access the mediation apparatus 5, to the user terminal 3 (step S5).

When the user terminal 3 receives the response for the redirect to cause the user terminal 3 to access the mediation apparatus 5 from the consumer apparatus 9, the user terminal 3 accesses the mediation apparatus 5, as instructed (step S7). In this access by the redirect, the user ID and a Fully Qualified Domain Name (FQDN) of the consumer apparatus 9 (which may be an identifier other than FQDN) are transmitted to the mediation apparatus 5.

The relay processing unit 51 of the mediation apparatus 5 receives the user ID and FQDN of the consumer apparatus 9 that is a redirecting source from the user terminal 3, and stores the received data into the data storage unit 52 (step S9). Then, the relay processing unit 51 identifies a predetermined access destination of the consumer apparatus 9 from the FQDN of the consumer apparatus 9 that is the redirecting source and the like, and accesses the identified access destination (step S11). As a result, a requesting source of the specific service becomes the mediation apparatus 5.

In response to the access from the mediation apparatus 5, the consumer apparatus 9 transmits a request for a request token, which includes a consumer key that has been obtained in advance from the provider apparatus 7 or the like, to the provider apparatus 7 (step S13). Except for a point that this step is executed in response to the access from the mediation apparatus 5, this step is the same as that in the conventional art, so further explanation is omitted. When the provider apparatus 7 receives a request for the request token from the consumer apparatus 9 (step S15), the provider apparatus 7 transmits an unauthorized request token to the consumer apparatus 9 (step S17). This step is also the same as that in the conventional art, so further explanation is omitted. The consumer apparatus 9 receives the unauthorized request token from the provider apparatus 7 (step S19). This step is also the same as that in the conventional art, so further explanation is omitted. The processing shifts to a processing in FIG. 5 through a terminal A.

Figure 5:
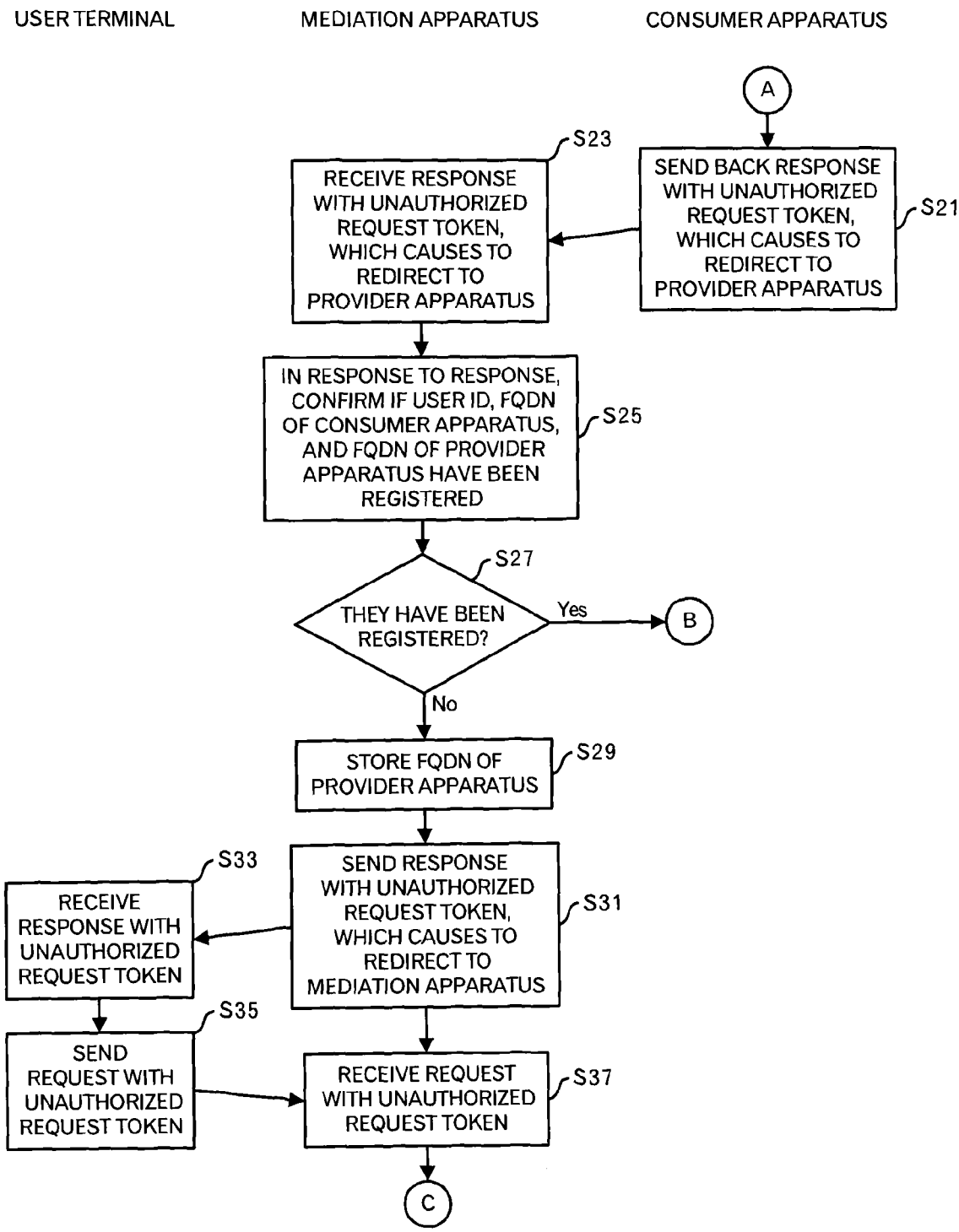
FIG. 5 is a diagram depicting a processing flow to explain the operations of the system in the embodiment.

Shifting to the explanation of the processing in FIG. 5, the consumer apparatus 9 sends back a response with the unauthorized request token, which causes the mediation apparatus 5 to redirect to the provider apparatus 7, to the mediation apparatus 5 (step S21). This response includes the FQDN (which may be an identifier other than the FQDN) of the provider apparatus 7. The relay processing unit 51 of the mediation apparatus 5 receives the response with the unauthorized request token, which causes to redirect to the provider apparatus 7, from the consumer apparatus 9 (step S23). Because this response includes the FQDN of the provider apparatus 7, the relay processing unit 51 of the mediation apparatus 5 confirms according to the received response, whether or not a combination of the user ID and the FQDN of the consumer apparatus 9, which are stored in the data storage unit 52, and the FQDN of the provider apparatus 7 has been registered in the automatic response DB 53 (step S25). When a corresponding record exists, that record is read out.

The automatic response DB 53 stores data as illustrated in FIG. 6, for example. In the example of FIG. 6, one or plural combinations are registered, each having a user ID, FQDN of the consumer apparatus 9, FQDN of the provider apparatus 7, matching data generated from data of a response received from the provider apparatus 7 and reply data generated from data transmitted to the provider apparatus 7. The user ID, FQDN of the consumer apparatus 9 and FQDN of the provider apparatus 7 are keys. The data format of FIG. 6 is a mere example, and for each combination of matching data and replay data, one record may be generated, and data representing the turn may be attached to each record.

When a record concerning a combination of the user ID, FQDN of the consumer apparatus 9 and FQDN of the provider apparatus 7 has been registered in the automatic response DB 53 (step S27: Yes route), the processing shifts to a processing in FIG. 14 through a terminal B. The processing subsequent to the terminal B is a processing when an automatic response is carried out.

When a record regarding the combination of the user ID, FQDN of the consumer apparatus 9 and FQDN of the provider apparatus 7 has not been registered in the automatic response DB 53 (step S27: No route), the relay processing unit 51 of the mediation apparatus 5 stores the FQDN of the provider apparatus 7 in the automatic response DB 53 as correlated with the user ID and FQDN of the consumer apparatus 9 (step S29). In the processing subsequent to this step, data concerning a transaction between the user terminal 3 and the provider apparatus 7 will be collected.

Then, the recording processing unit 511 of the mediation apparatus 5 changes the redirecting destination of the response received from the consumer apparatus 9 to the mediation apparatus 5, and then transmits the response with the unauthorized request token, which causes the user terminal 3 to redirect to the mediation apparatus 5, to the user terminal 3 (step S31). When the user terminal 3 receives the response with the unauthorized request token from the mediation apparatus 5 (step S33), the user terminal 3 transmits a request with the received and unauthorized request token to the mediation apparatus 5 in response to a redirect instruction (step S35). The recording processing unit 511 of the mediation apparatus 5 receives the request with the unauthorized request token from the user terminal 3 (step S37). The processing shifts to a processing in FIG. 7 through a terminal C.

Figure 7:
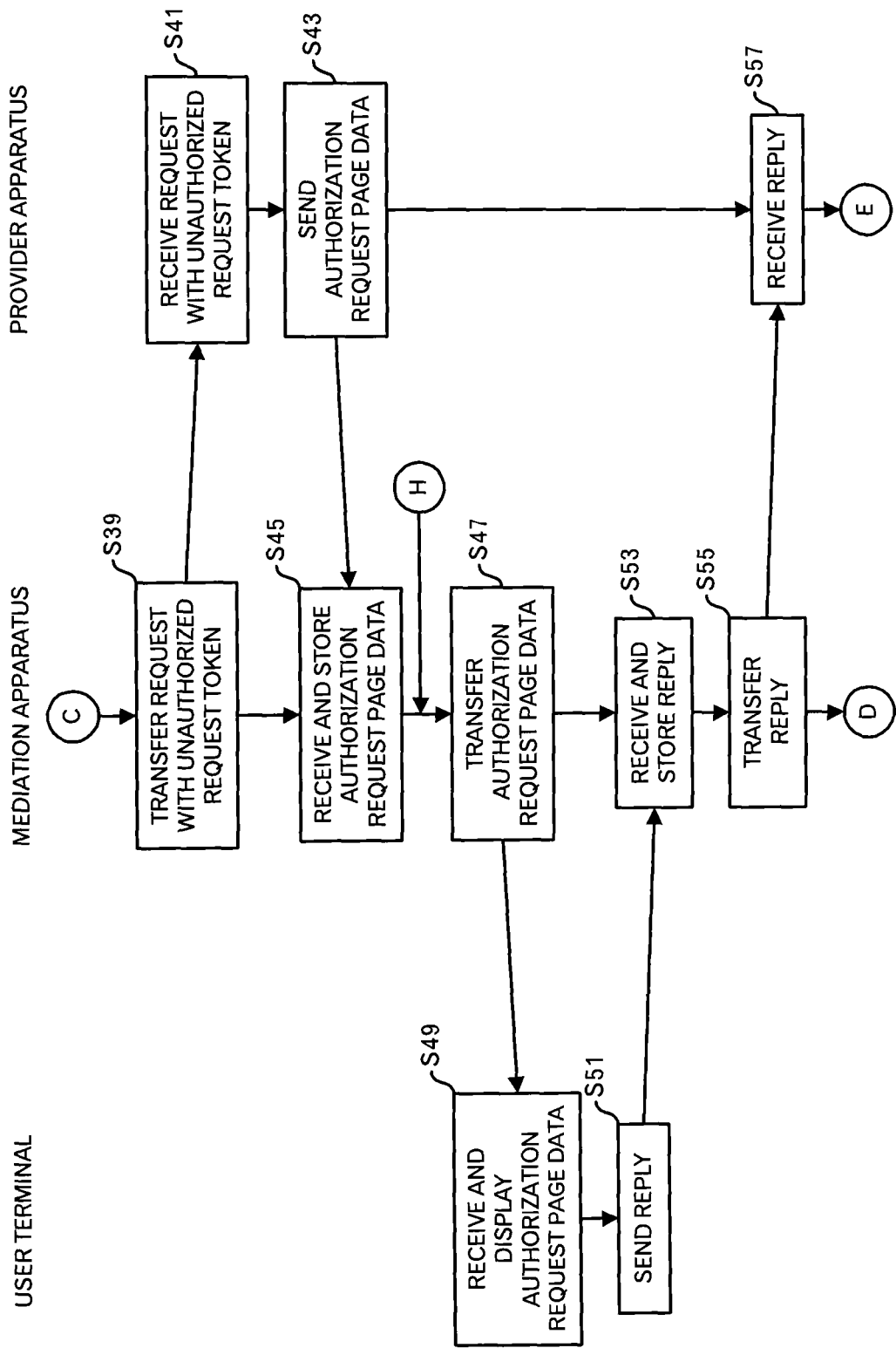
FIG. 7 is a diagram depicting a processing flow to explain operations of the system in the embodiment.

Shifting to the explanation of the processing in FIG. 7, the recording processing unit 511 transfers the request with the unauthorized request token to the provider apparatus 7 (step S39). When the provider apparatus 7 receives the request with the unauthorized request token from the mediation apparatus 5 (step S41), the provider apparatus 7 transmits an authorization request page data to request to allow the access right to the consumer apparatus 9 to the mediation apparatus 5 (step S43). The recording processing unit 511 of the mediation apparatus 5 receives the authorization request page data, and stores the authorization request page data in the data storage unit 52 in association with the user ID, FQDN of the provider apparatus 7 and FQDN of the consumer apparatus 9 (step S45).

Figure 8:
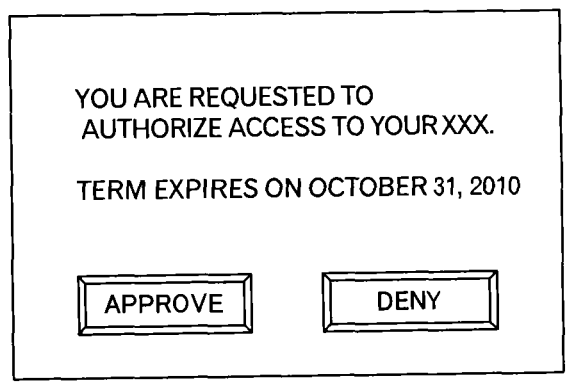
FIG. 8 is a diagram depicting an example of an authorization request page.
Figure 4:
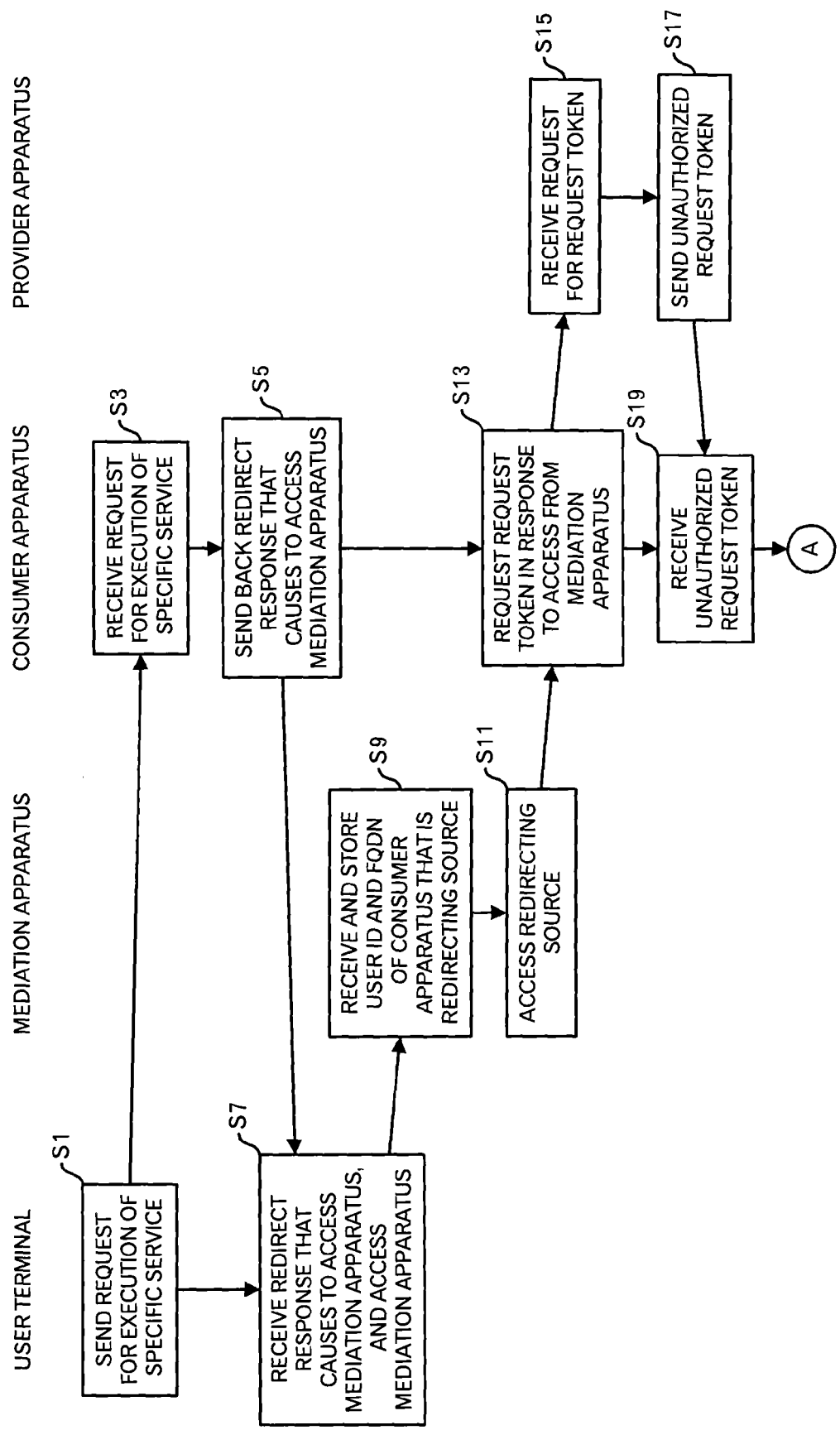
FIG. 4 is a diagram depicting a processing flow to explain operations of the system in the embodiment.

In addition, the recording processing unit 511 transfers the received authorization request page data to the user terminal 3 (step S47). The user terminal 3 receives the authorization request page data from the mediation apparatus 5, and displays the page data on a display apparatus (step S49). For example, a display as illustrated in FIG. 8 is made on the display apparatus. In an example of FIG. 8, a message representing that the consumer requests an access to data "XXXX", valid period of the access right, an "approve" button and "deny" button are displayed. The user clicks the "approve" button or "deny" button. Normally, the "approve" button is clicked. In this embodiment, as an assumption, the login to the provider apparatus 7 can be omitted based on a technique such as the single sign-on, however, when such a technique is not used, the user logs in the provider apparatus 7 using the user ID and password, for example. Furthermore, in the example of FIG. 8, a screen example is illustrated in which the approval or denial can be instructed in one screen, however, the approval or denial may be inputted throughout plural screens.

The user terminal 3 transmits an answer, namely, data representing the approval or denial to the mediation apparatus 5 in response to the click from the user (step S51). The recording processing unit 511 of the mediation apparatus 5 receives the answer from the user terminal 3, and stores data of the answer in the data storage unit 52 as correlated with the user ID, FQDN of the provider apparatus 7 and FQDN of the consumer apparatus 9 (step S53). Then, the recording processing unit 511 of the mediation apparatus 5 transfers the received reply to the provider apparatus 7 (step S55). The provider apparatus 7 receives the reply from the mediation apparatus 5 (step S57). The processing shifts to the processing in FIG. 9 through terminals D and E.

Shifting to the explanation of the processing in FIG. 9, after the step S55, the recording processing unit 511 of the mediation apparatus 5 generates reply data and matching data, which are to be registered in the automatic response DB 53, from the authorization request page data received at the step S45 and data of the answer received at the step S53, and stores the generated data into the data storage unit 52 as correlated with the user ID, FQDN of the provider apparatus 7 and FQDN of the consumer apparatus 9 (step S59).

This processing will be explained by using FIGS. 10 to 12. In case of the authorization request page data as illustrated in FIG. 8, data of tags is included as illustrated in FIG. 10. In other words, tags relating to the answer of the approval and denial are included between a <form> tag and a </form> tag. On the other hand, when the "approve" button is clicked, a POST message in a Hyper Text Transfer Protocol (HTTP), which has data as illustrated in FIG. 11 in a body, is transmitted as data of the answer. As illustrated in FIG. 11, plural combinations of a key of a request parameter and its value are coupled with "&". The keys of the request parameters "approve", "hidden_key1" and "hidden_key2" are values of the attribute "name" within an <input> tag in FIG. 10. In addition, as values of the keys of the request parameters, values of the attribute "value" within the same <input> tag are set. Specifically, as for the key of the request parameter "approve", a value "approval" of the attribute "value" in the same <input> tag as that of the attribute name="approve" is set. In addition, as for the key of the request parameter "hidden_key1", a value "hidden_val1" of the attribute "value" in the same <input> tag as that of the attribute name="hidden_key1" is set. Furthermore, as for the key of the request parameter "hidden_key2", a value "hidden_val2" of the attribute "value" in the same <input> tag as that of the attribute name="hidden_key2" is set.

Thus, by extracting part of the authorization request page data, which is associated with the answer data, matching data to confirm whether or not the substantially same authorization request page data was transmitted is generated. The authorization request page data may include plural <form> tags, and therefore, in order to identify which <form> tag is, attributes "id" and "name" of the <form> tag and their values, and an attribute "action" representing a transmission destination of the answer data and its value are also extracted. "Method" is also extracted, because POST or GET may be used.

However, the matching data does not include data that may change for each transmission of the authorization request page data or after a certain period elapsed. For example, because a value of the attribute "value" in the <input> tag may be changed, the matching data does not include the attribute "value" and its value. A well-known syntax analysis is used for this extraction processing.

For example, in the example of FIG. 10, data illustrated in FIG. 12 is extracted as the matching data, and the matching data is stored in the data storage unit 52. In the example of FIG. 12, the top represents an attribute and its value, which are keys within the <form> tag, and 3 following lines are data to be used in the answer data.

On the other hand, keys of the request parameters are extracted from the answer data. In other words, by extracting "approve", "hidden_key1" and "hidden_key2", the reply data is generated. Because a value of the key of the request parameter may vary, it is not included in the reply data.

In case of the Web page data in another format, the matching data and reply data are extracted according to another format. For example, by using a technique explained in the column of the background art or Japan Laid-Open Patent Publication No. 2006-107007, the matching data and reply data are extracted along with the procedure.

Returning to the explanation of the processing in FIG. 9, the provider apparatus 7 transmits data of a next response to the mediation apparatus 5 (step S61). The recording processing unit 511 of the mediation apparatus 5 receives the next response data (step S63), and confirms whether or not the authorized request token is attached (step S65). The attachment of the authorized request token means that the confirmation for his or her intention with respect to the approval of the access right to the consumer apparatus 9 has been completed. Therefore, after shifting to the step S69, the processing of the recording processing unit 511 is terminated. In this case, the response received from the provider apparatus 7 is a response with the authorized request token, which causes to redirect to the consumer apparatus 9.

On the other hand, when no authorized request token is attached to the received response, the recording processing unit 511 stores data of the received response into the data storage unit 52 (step S67), because there is a next procedure, and the processing returns to the step S47 through a terminal H. Namely, matching data and reply data in the next procedure are generated.

There is also a case where, when the user selects "deny" in the screen in FIG. 8 or any error occurs, the transaction between the mediation apparatus 5 and the provider apparatus 7 may be terminated without receiving the authorized request token. In such a case, the matching data, reply data and data regarding the transaction, which are stored in association with a combination of the user ID, FQDN of the provider apparatus 7 and FQDN of the consumer apparatus 9, are left in the data storage unit 52 without being registered in the automatic response DB 53. In such a case, by discarding data left in the data storage unit 52 when a predetermined period elapsed since data was firstly or finally stored, data for the transaction that is not normally completed is discarded.

When the response with the authorized request token is received, the recording processing unit 511 transfers the response with the authorized request token, which causes to redirect to the consumer apparatus 9, after changing the destination to the user terminal 3 (step S69). The user terminal 3 receives the response with the authorized request token, which causes to redirect to the consumer apparatus 9 (step S71). The processing of the user terminal 3 shifts to a processing in FIG. 13 through a terminal J.

On the other hand, the recording processing unit 511 of the mediation apparatus 5 registers a combination of the matching data and the reply data, which are stored in the data storage unit 52, in the automatic response DB 53 as correlated with a combination of the user ID, FQDN of the provider apparatus 7 and FQDN of the consumer apparatus 9 (step S73). Thus, after confirming that the transaction between the user terminal 3 and the provider apparatus 7 has normally been completed, the data is written into the automatic response DB 53. Therefore, appropriate data is stored in the automatic response DB 53.

Figure 13:
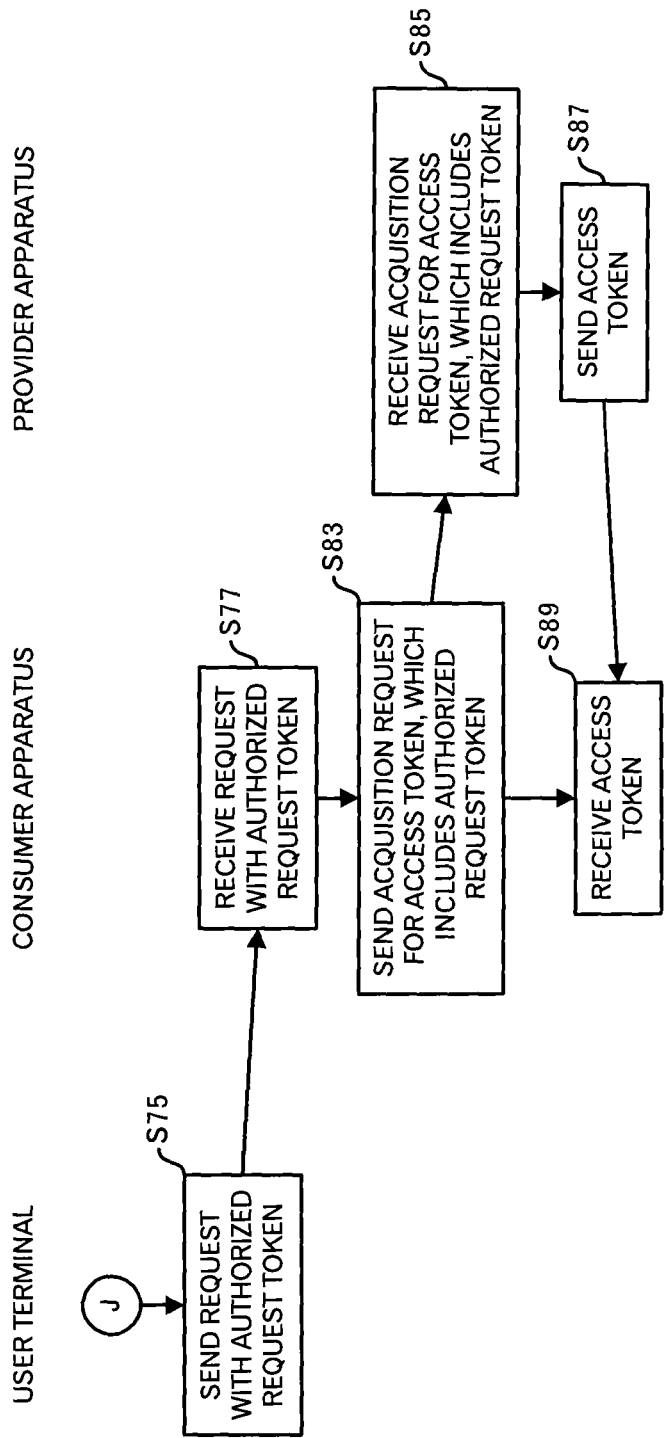
FIG. 13 is a diagram depicting a processing flow to explain the operations of the system in the embodiment.

Shifting to the explanation of the processing in FIG. 13, the user terminal 3 transmits a request with the authorized request token to the consumer apparatus 9 by the redirect (step S75). Then, the consumer apparatus 9 receives the request with the authorized request token from the user terminal 3 (step S77). As a result, the consumer apparatus 9 has obtained the authorized request token. Although it is not illustrated, after this, the consumer apparatus 9 may send a response for an instruction to execute a specific service, however, this point is not a main port ion of this embodiment. Therefore, further explanation is omitted.

After that, the consumer apparatus 9 transmits an acquisition request for an access token, which includes the authorized request token and the like, to the provider apparatus 7 (step S83). When the provider apparatus 7 receives the acquisition request for the access token, which includes the authorized request token and the like, from the consumer apparatus 9 (step S85), the provider apparatus 7 confirms the authorized request token and the like, and transmits the access token to the consumer apparatus 9 if there is no problem (step S87). The consumer apparatus 9 receives the access token from the provider apparatus 7 (step S89). The following steps are the same as those in the conventional art, so the explanation is omitted.

By carrying out the aforementioned processing, data for the automatic response has been registered in the automatic response DB 53.

Next, a case where it is determined at the step S27 in FIG. 5 that the combination of the user ID, FQDN of the provider apparatus 7 and FQDN of the consumer apparatus 9 has been registered will be explained by using FIGS. 14 to 18. As described above, the matching data and reply data, which are correlated with the combination of the user ID, FQDN of the provider apparatus 7 and FQDN of the consumer apparatus 9, are read from the automatic response DB 53.

The response processing unit 512 of the mediation apparatus 5 transmits a request with the unauthorized request token, which was received at the step S23, to the provider apparatus 7 (step S91). When the provider apparatus 7 receives the request with the unauthorized request token from the mediation apparatus 5 (step S93), the provider apparatus 7 performs a predetermined processing to transmit response data (step S95). The response processing unit 512 of the mediation apparatus 5 receives the response data from the provider apparatus 7, and stores the received response data in a storage device such as a main memory (step S97). Then, the response processing unit 512 confirms whether or not the received response data matches the matching data read from the automatic response DB 53 (step S99). Specifically, after confirming whether or not the response data includes a <form> tag including the attribute and attribute name (the first line in FIG. 12), which is a key and included in the matching data, and it is confirmed whether or not <input> tags to be matched (the second line to fourth line in FIG. 12) are included between that <form> tag and a corresponding </form> tag. When both of conditions are satisfied, it is determined that the response data matches the matching data. Because the step S99 may be carried out plural times, the matching data and reply data are used in order of the registration in the automatic response DB 53 (when the ranking is made, the order follows the ranking, and when the ranking is not made, the order follows the arrangement in the DB).

When the response data does not match the matching data (step S101: No route), the processing shifts to a processing in FIG. 18 through a terminal F. On the other hand, when the response data matches the matching data (step S101: Yes route), the response processing unit 512 generates answer data from the read reply data and the received response data, and transmits the answer data to the provider apparatus 7 (step S103). Specifically, because the reply data includes an attribute value of the attribute "name" in the <input > tag, which is identified in the matching data, as the key of the request parameter, the response processing unit 512 reads out an attribute value of the attribute "value" in the same <input> tag in the response data to couple the attribute values by using "=". When the plural keys of the request parameters are included in the reply data, they are coupled using "&", and placed in the body of the POST message in HTTP. As the transmission destination, the attribute value of the attribute "action" in the <form> tag is used.

At the registration, the response data as illustrated in FIG. 10 (the aforementioned authorization request page data) was received. However, even when the response data as illustrated in FIG. 15 is received, answer data as illustrated in FIG. 16 can be generated when carrying out the aforementioned processing. In other words, the attribute "name" in the <input> tag is "approve", and the attribute value of the attribute "value" is "allowance" instead of "approval". Therefore, "approve=allowance" is obtained. In addition, the attribute "name" in the <input> tag is "hidden_key1", and the attribute value of the attribute "value" is "secret_val1" instead of "hidden_val1". Therefore, "hidden_key1=secret_val1" is obtained. Furthermore, the attribute "name" in the <input> tag is "hidden_key2", and the attribute value of the attribute "value" is "secret_val2" instead of "hidden_val2". Therefore, "hidden_key2=secret_val2" is obtained. Then, they are coupled by using "&".

Thus, it is possible to generate answer data appropriate for the response data at this time from the reply data and the response data.

The provider apparatus 7 receives the answer data from the mediation apparatus 5 (step S105), and generates next response data by carrying out a predetermined processing to transmit the next response data to the mediation apparatus 5 (step S107). The response processing unit 512 of the mediation apparatus 5 receives the next response data from the provider apparatus 7 (step S109), and determines whether or not the authorized request token is attached to the next response data (step S111). When the authorized request token is not attached (step S111: No route), the processing returns to the step S99 in order to execute a processing with respect to the matching data and reply data on the next turn.

On the other hand, when the authorized request token is attached to the next response data (step S111: Yes route), this means that the procedure for the authorization of the access right to the consumer apparatus 9 is successfully completed. Therefore, the processing shifts to a processing in FIG. 17 through a terminal G. Incidentally, the response with the authorized request token, which causes to redirect to the consumer apparatus 9, was received.

Shifting to the explanation of the processing in FIG. 17, the response processing unit 512 of the mediation apparatus 5 transfers the response with the authorized request token, which causes to redirect to the consumer apparatus 9, to the user terminal 3 (step S113). When the user terminal 3 receives the response with the authorized request token from the mediation apparatus 5 (step S115), the user terminal 3 transmits a request with the authorized request token to the consumer apparatus 9 in response to an instruction of the redirect (step S117). The consumer apparatus 9 receives the request with the authorized request token from the user terminal 3 (step S119). The subsequent processing is the same as the processing of the step S83 and subsequent processing in FIG. 13. Therefore, the explanation is omitted.

By doing so, the user had the mediation apparatus 5 perform the operations. Therefore, it becomes possible to simply approve the access right to the consumer apparatus 9.

Figure 14:
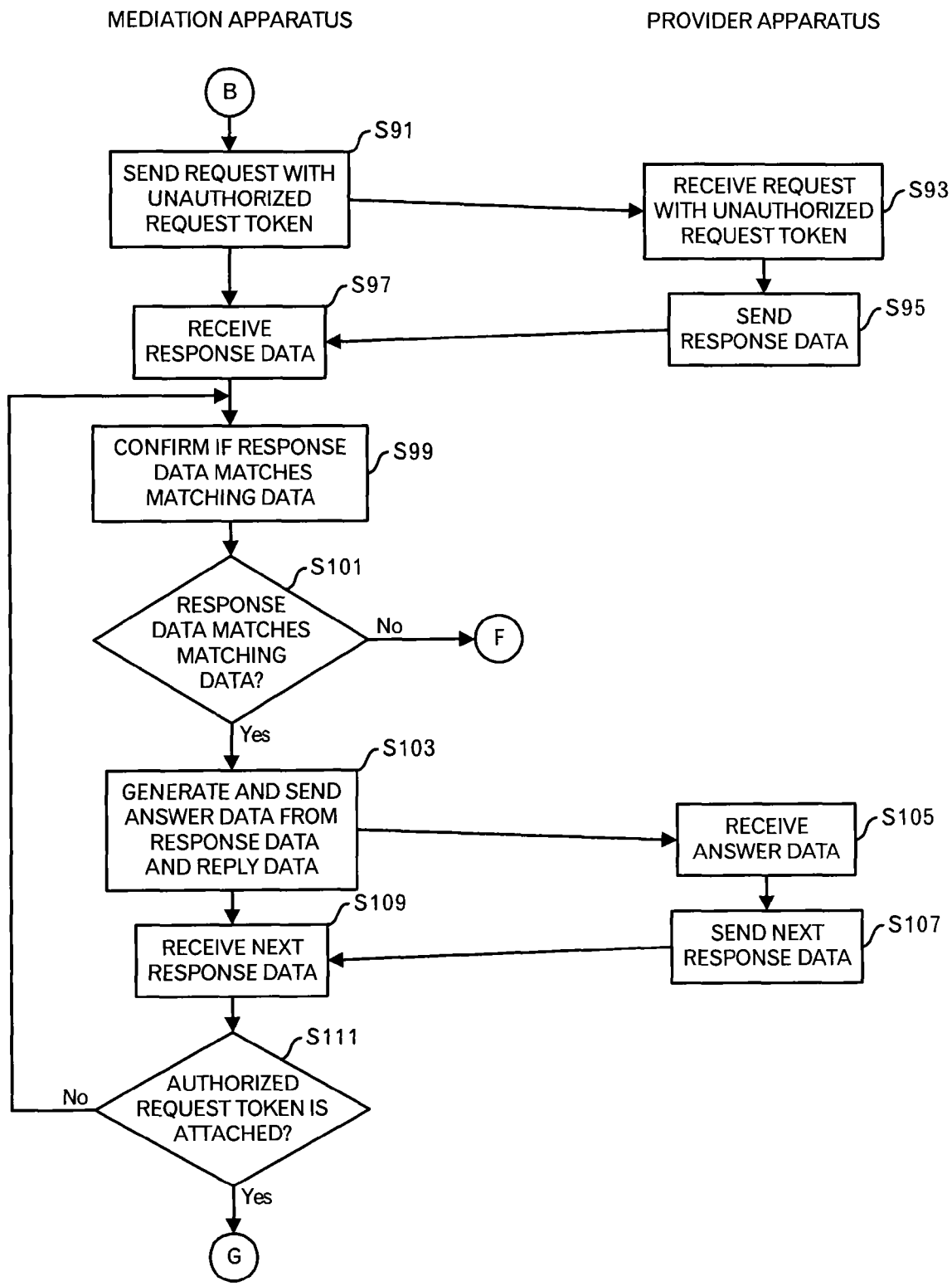
FIG. 14 is a diagram depicting a processing flow to explain the operations of the system in the embodiment.
Figure 18:
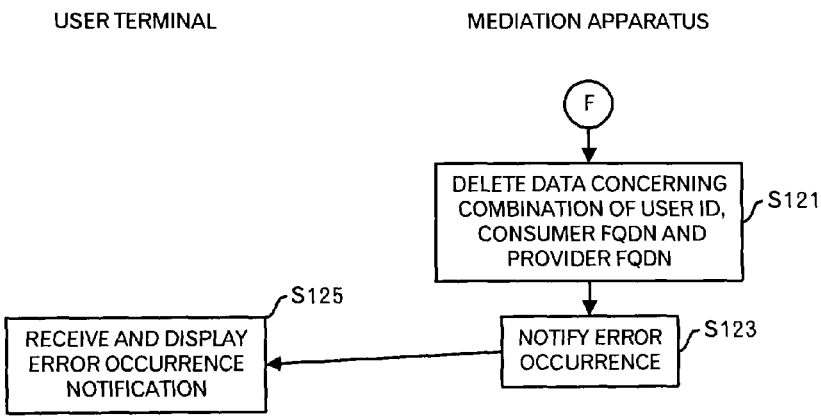
FIG. 18 is a diagram depicting a processing flow to explain the operations of the system in the embodiment.

On the other hand, a processing executed when it is determined at the step S101 in FIG. 14 that the response data does not match the matching data will be explained using FIG. 18. The response processing unit 512 of the mediation apparatus 5 deletes data including a combination of the user ID, FQDN of the provider apparatus 7 and FQDN of the consumer apparatus 9 in the automatic response DB 53 (step S121). This is because it is determined that the intention confirmation procedure to approve the access right is largely changed, and data before the change cannot be used. Therefore, such data is deleted. Then, the response processing unit 512 notifies the user terminal 3 of an error occurrence (step S123). The user terminal 3 receives the error occurrence notification from the mediation apparatus 5, and displays the error occurrence notification on a display apparatus (step S125). By carrying out such a processing, the user can recognize that data for the automatic response registered in the mediation apparatus 5 becomes invalid, and the procedure is carried out again from the initial step. Moreover, the consumer apparatus 9 and provider apparatus 7 are left during the processing. However, typically the time-out occurs, so special problem does not occur.

Although the embodiment of this technique was explained, this technique is not limited to the embodiment. For example, the functional block diagram illustrated in FIG. 3 is a mere example, and does not always correspond to an actual program module configuration.

Moreover, as for the processing flow of the aforementioned processing, as long as the results do not change, the processing turns may be exchanged or plural steps may be executed in parallel.

Figure 19:
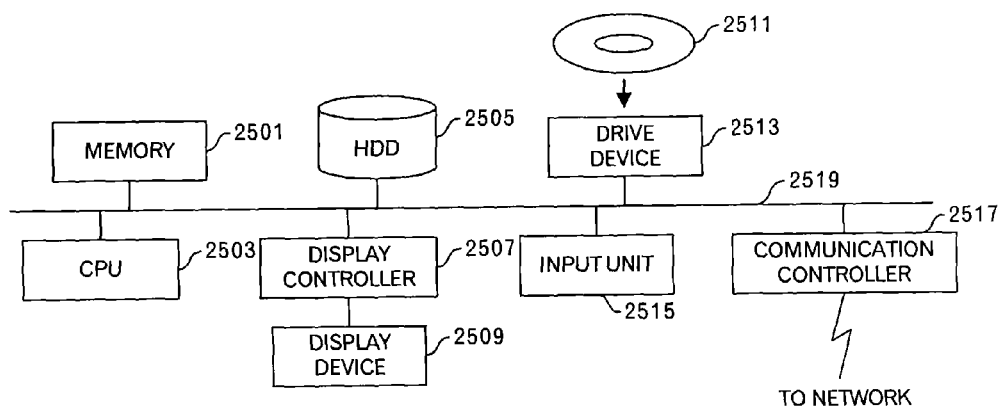
FIG. 19 is a functional block diagram of a computer.

In addition, the aforementioned mediation apparatus 5, consumer apparatus 9 and provider apparatus 7 are computer devices as illustrated in FIG. 19. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 19. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are summarized as follows:

A mediation processing method relating to the embodiments is executed by a mediation apparatus respectively communicating with a first apparatus (e.g. provider apparatus) holding data of a user, a second apparatus (e.g. consumer apparatus) obtaining and using data of the user from the first apparatus and a terminal of the user. Moreover, this mediation processing method includes: (A) obtaining an identifier of the user and an identifier of the second apparatus from the terminal of the user, and storing obtained data into a data storage unit; (B) upon receipt of a first response including the identifier of the first apparatus and first data (e.g. unauthorized request token) that the first apparatus issues and that represents that use of the data of the user by the second apparatus is unauthorized, from the second apparatus after accessing the second apparatus, confirming whether or not a combination of the identifier of the user, the identifier of the second apparatus, which are stored in the data storage unit, and an identifier of the first apparatus is stored in an automatic response data storage unit (e.g. automatic response DB) storing data for an automatic response for the first apparatus; (C) upon detecting that the combination is not stored in the automatic response data storage unit, transmitting the first response to the terminal of the user; causing the terminal of the user to perform a transaction for an authorization for the use of the data of the user by the second apparatus with the first apparatus through the mediation apparatus to store data of the transaction, into the data storage unit; and (D) upon receipt of a response including second data (e.g. authorized request token) representing that the use of the data of the user by the second apparatus is authorized from the first apparatus, storing matching data and reply data, which are generated from the data of the transaction, which is stored in the data storage unit, into the automatic response data storage unit as correlated with the identifier of the user, the identifier of the second apparatus and the identifier of the first apparatus.

Thus, storage of the data for the transaction is started at an appropriate timing that the first data is received and data that becomes a key has not been registered in the automatic response data storage unit. Moreover, the matching data and the reply data, which are used for the automatic response, are registered in the automatic response data storage unit at an appropriate timing that the second data is received. Thus, because appropriate data is registered in the automatic response data storage unit, it is possible for the user to omit the same operations at the next time and subsequent times, and the operations of the user are simplified.

The mediation processing method relating to the embodiments may further include: (E) generating the reply data by extracting a key (or elements of arguments) of a request parameter from third data that is included in the data of the transaction, which is stored in the data storage unit, and is received from the terminal of the user; and (F) generating the matching data by extracting a portion including, as an attribute value of a predetermined attribute, the key of the request parameter that is included in the reply data from fourth data that is included in the data of the transaction and is received immediately before the first data from the first apparatus.

Thus, the matching data enabling to identify the substantially same response at the automatic response and the reply data enabling to automatically generate appropriate answer data from the received response are generated.

Moreover, the mediation processing method relating to the embodiments may further include: (G) upon detecting that the combination is stored in the automatic response data storage unit, reading the matching data and the replay data that are stored as correlated with the obtained identifier of the user, the obtained identifier of the second apparatus and the identifier of the first apparatus from the automatic response data storage unit; second transmitting the first response to the first apparatus; receiving second response from the first apparatus; (H) determining whether or not the second response includes the read matching data; (I) upon determining that the second response includes the matching data, generating answer data from the second response and the reply data; and third transmitting the answer data to the first apparatus. In this case, the second transmitting, the receiving and the determining may be repeated until it is determined that the second response includes the matching data and the second data is received from the first apparatus. By doing so, data stored in the automatic response data storage unit can be effectively utilized to make the user operations simplified.

A system relating to the embodiments includes: (A) a first apparatus obtaining and using data of a user from a second apparatus holding the data of the user; (B) a terminal of the user; and (C) a mediation apparatus communicating with the terminal of the user, the first apparatus and the second apparatus. Then, the first apparatus transmits a first response that includes an identifier of the first apparatus and causes the terminal of the user to access the mediation apparatus in response to a request from the terminal of the user.

Moreover, the mediation apparatus has (A) a relay processing unit that receives an identifier of the user and an identifier of the first apparatus, from the terminal of the user, and stores the received data into a data storage unit, and upon receipt of a second response including the identifier of the first apparatus and first data that the second apparatus issues and that represents that use of the data of the user by the first apparatus is unauthorized, from the first apparatus after accessing the first apparatus, confirms whether or not a combination of the identifier of the user, the identifier of the first apparatus, which is stored in the data storage unit, and an identifier of the second apparatus is stored in an automatic response data storage unit storing data for an automatic response for the second apparatus; and (B) a recording processing unit that, upon detecting that the combination is not stored in the automatic response data storage unit, transmits the second response to the terminal of the user, and causes the terminal of the user to perform a transaction for an authorization for the use of the data of the user by the first apparatus with the second apparatus through the mediation apparatus to store data of the transaction into the data storage unit, and upon receipt of a third response including second data representing that the use of the data of the user by the first apparatus is authorized from the second apparatus, stores matching data and reply data, which are generated from the data of the transaction, which is stored in the data storage unit, into the automatic response data storage unit as correlated with the identifier of the user, the identifier of the first apparatus and the identifier of the second apparatus.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mediation processing method, comprising:
   obtaining, by a mediation apparatus, an identifier of a user and an identifier of a first apparatus from a terminal of the user, wherein the first apparatus obtains data of the user from a second apparatus that stores the data of the user, and the mediation apparatus is coupled to the first apparatus, the second apparatus, and the terminal of the user;
   upon receipt of a first response from the first apparatus, confirming, by the mediation apparatus, whether a combination of the obtained identifier of the user, the obtained identifier of the first apparatus and an identifier of the second apparatus is included in data for an automatic response for the second apparatus, wherein the first response includes the identifier of the second apparatus and first data that the second apparatus issues and that represents that use of the data of the user by the first apparatus is unauthorized, and the data for the automatic response is stored in a storage unit;
   upon detecting that the combination is not stored in the storage unit, transmitting, by the mediation apparatus, the first response to the terminal of the user;
   causing, by the mediation apparatus, the terminal of the user to perform a transaction for an authorization for the use of the data of the user by the first apparatus with the second apparatus through the mediation apparatus to store data of the transaction; and
   upon receipt of a response including second data representing that the use of the data of the user by the first apparatus is authorized from the second apparatus, storing, by the mediation apparatus, storing matching data and reply data, which are generated from the data of the transaction, into the storage unit as correlated with the obtained identifier of the user, the obtained identifier of the first apparatus and the identifier of the second apparatus.

2. The mediation processing method as set forth in claim 1, further comprising:
   generating the reply data by extracting a key of a request parameter from third data that is included in the data of the transaction and is received from the terminal of the user; and
   generating the matching data by extracting a portion including, as an attribute value of a predetermined attribute, the key of the request parameter that is included in the reply data from fourth data that is included in the data of the transaction and is received immediately before the first data from the second apparatus.

3. The mediation processing method as set forth in claim 1, further comprising:
   upon detecting that the combination is stored in the storage unit, reading the matching data and the reply data that are stored as correlated with the obtained identifier of the user, the obtained identifier of the first apparatus and the identifier of the second apparatus from the storage unit;
   second transmitting the first response to the second apparatus;
   receiving second response from the second apparatus;
   determining whether the second response includes the read matching data;
   upon determining that the second response includes the matching data, generating answer data from the second response and the reply data; and
   third transmitting the answer data to the second apparatus, and
   wherein the second transmitting, the receiving and the determining are repeated until it is determined that the second response includes the matching data and the second data is received from the second apparatus.

4. A mediation apparatus, comprising:
   a storage unit that stores data for an automatic response to a first apparatus that stores data of a user; and
   a hardware processor configured to execute:
      obtaining an identifier of the user and an identifier of a second apparatus that obtains the data of the user from the first apparatus and a terminal of the user, from the terminal of the user;
      upon receipt of a first response including an identifier of the first apparatus and first data that the first apparatus issues and that represents that use of the data of the user by the second apparatus is unauthorized, from the second apparatus after accessing the second apparatus, confirming whether a combination of the obtained identifier of the user, the obtained identifier of the second apparatus and the identifier of the first apparatus is stored in the storage unit;
      upon detecting that the combination is not stored in the storage unit, transmitting the first response to the terminal of the user;
      causing the terminal of the user to perform a transaction for an authorization for the use of the data of the user by the second apparatus with the first apparatus through the mediation apparatus to store data of the transaction; and
      upon receipt of a response including second data representing that the use of the data of the user by the second apparatus is authorized from the first apparatus, storing matching data and reply data, which are generated from the data of the transaction, into the storage unit as correlated with the obtained identifier of the user, the obtained identifier of the second apparatus and the identifier of the first apparatus.

5. The mediation apparatus as set forth in claim 4, wherein the hardware processor further executes:
   generating the reply data by extracting a key of a request parameter from third data that is included in the data of the transaction and is received from the terminal of the user; and
   generating the matching data by extracting a portion including, as an attribute value of a predetermined attribute, the key of the request parameter that is included in the reply data from fourth data that is included in the data of the transaction and is received immediately before the first data from the first apparatus.

6. The mediation apparatus as set forth in claim 4, wherein the hardware processor further executes:

upon detecting that the combination is stored in the storage unit, reading the matching data and the reply data that are stored as correlated with the obtained identifier of the user, the obtained identifier of the second apparatus and the identifier of the first apparatus from the storage unit;

second transmitting the first response to the first apparatus;

receiving second response from the first apparatus;

determining whether the second response includes the read matching data;

upon determining that the second response includes the matching data, generating answer data from the second response and the reply data; and third transmitting the answer data to the first apparatus, and wherein the second transmitting, the receiving and the determining are repeated until it is determined that the second response includes the matching data and the second data is received from the first apparatus.

7. A system, comprising:

a first apparatus that obtains data of a user from a second apparatus holding the data of the user;

a terminal of the user; and a mediation apparatus that communicates with the terminal of the user, the first apparatus and the second apparatus, and wherein the first apparatus transmits a first response that includes an identifier of the first apparatus and causes the terminal of the user to access the mediation apparatus in response to a request from the terminal of the user, and the mediation apparatus includes circuitry configured to receive an identifier of the user and an identifier of the first apparatus, from the terminal of the user;

upon receipt of a second response including an identifier of the first apparatus and first data that the second apparatus issues and that represents that use of the data of the user by the first apparatus is unauthorized, from the first apparatus after accessing the first apparatus, confirm whether a combination of the received identifier of the user, the received identifier of the first apparatus and an identifier of the second apparatus is stored in a storage unit storing data for an automatic response for the second apparatus;

upon detecting that the combination is not stored in the storage unit, transmit the second response to the terminal of the user;

cause the terminal of the user to perform a transaction for an authorization for the use of the data of the user by the first apparatus with the second apparatus through the mediation apparatus to store data of the transaction; and upon receipt of a third response including second data representing that the use of the data of the user by the first apparatus is authorized from the second apparatus, store matching data and reply data, which are generated from the data of the transaction, into the storage unit as correlated with the obtained identifier of the user, the obtained identifier of the first apparatus and the identifier of the second apparatus.

8. The system as set forth in claim 7, wherein the circuitry is further configured to:

generate the reply data by extracting a key of a request parameter from third data that is included in the data of the transaction and is received from the terminal of the user; and generate the matching data by extracting a portion including, as an attribute value of a predetermined attribute, the key of the request parameter that is included in the reply data from fourth data that is included in the data of the transaction and is received immediately before the first data from the second apparatus.

9. The system as set forth in claim 7, wherein the circuitry is further configured to:

upon detecting that the combination is stored in the storage unit, read the matching data and the reply data that are stored as correlated with the obtained identifier of the user, the obtained identifier of the first apparatus and the identifier of the second apparatus from the storage unit;

transmit the second response to the second apparatus;

receive a fourth response from the second apparatus;

determine whether the fourth response includes the read matching data;

upon determining that the fourth response includes the matching data, generate answer data from the fourth response and the reply data; and transmit the answer data to the second apparatus, and wherein transmitting the second response, receiving the fourth response, and determining whether the fourth response includes the read matching data are repeated until it is determined that the fourth response includes the matching data and the second data is received from the second apparatus.

* * * * *